(12) United States Patent
Higuma et al.

(10) Patent No.: US 11,355,015 B2
(45) Date of Patent: Jun. 7, 2022

(54) DISPLAY DEVICE FOR VEHICLE, DISPLAY METHOD FOR VEHICLE, AND STORAGE MEDIUM

(71) Applicant: TOYOTA JIDOSHA KABUSHIKI KAISHA, Toyota (JP)

(72) Inventors: Tomohito Higuma, Toyota (JP); Tomoaki Iida, Toyota (JP); Yohei Satomi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/343,842

(22) Filed: Jun. 10, 2021

(65) Prior Publication Data

US 2021/0407299 A1 Dec. 30, 2021

(30) Foreign Application Priority Data

Jun. 29, 2020 (JP) .............................. JP2020-112169

(51) Int. Cl.
| | |
|---|---|
| *G08G 1/16* | (2006.01) |
| *B60R 1/00* | (2022.01) |
| *H04N 5/265* | (2006.01) |
| *G06T 7/70* | (2017.01) |
| *G06V 10/25* | (2022.01) |
| *G06V 20/58* | (2022.01) |

(52) U.S. Cl.
CPC .............. *G08G 1/167* (2013.01); *B60R 1/00* (2013.01); *G06T 7/70* (2017.01); *G06V 10/25* (2022.01); *G06V 20/58* (2022.01); *H04N 5/265* (2013.01); *B60R 2300/105* (2013.01); *B60R 2300/304* (2013.01); *B60R 2300/307* (2013.01); *B60R 2300/802* (2013.01); *B60R 2300/8066* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 2019/0126825 A1* | 5/2019 | Park | G06T 3/4038 |
| 2019/0174065 A1* | 6/2019 | Asai | B60R 1/00 |

FOREIGN PATENT DOCUMENTS

JP 2016189576 A 11/2016

\* cited by examiner

*Primary Examiner* — Rebecca A Volentine
(74) *Attorney, Agent, or Firm* — Dickinson Wright, PLLC

(57) ABSTRACT

A display device for a vehicle, including: a rear imaging section that captures a rear image; a rear lateral imaging section that captures rear lateral images; and a control section that generates a combined image in which a rear processed image obtained by processing the rear image with a first parameter, and rear lateral processed images obtained by processing rear lateral images with a second parameter, are combined, wherein the control section further identifies an object existing in the rear image or the rear lateral images; acquires relative information including relative position and relative speed of the object with respect to the vehicle, and blind spot regions of the combined image; and, based thereon, if the object will disappear from the combined image due to entering into the blind spot regions, changes the blind spot regions by adjusting the first and second parameters.

8 Claims, 12 Drawing Sheets

DISPLAY DEVICE FOR VEHICLE, DISPLAY METHOD FOR VEHICLE, AND STORAGE MEDIUM

CROSS-REFERENCE TO RELATED APPLICATION

This application is based on and claims priority under 35 USC 119 from Japanese Patent Application No. 2020-112169 filed on Jun. 29, 2020, the disclosure of which is incorporated by reference herein.

BACKGROUND

The present disclosure relates to a display device for a vehicle, a display method for a vehicle, and a storage medium.

RELATED ART

Japanese Patent Application Laid-Open (JP-A) No. 2016-189576 discloses the following technique. Namely, the absence/presence of an obstacle in a first rear image in which the rear side is imaged from the rear portion of a vehicle body, a second rear image in which the rear right side that includes the right lateral side of the vehicle body is imaged, and a third rear image in which the rear left side that includes the left lateral side of the vehicle body is imaged, is detected. If an obstacle is detected, the first rear image, the second rear image and the third rear image are transformed by using homography that is derived on the basis of the distance from the rear portion of the vehicle body to the obstacle. Then, the transformed first rear image, second rear image and third rear image are combined so as to generate a panorama combined image in which the rear end portion of the vehicle body is the viewpoint, and this combined image is displayed on a display device.

In this technique, in a case in which an object such as another vehicle or a motorcycle or the like enters into a blind spot region that arises accompanying the combining of the plural captured images, due to the object disappearing from the combined image, a person viewing the combined image cannot see the object.

SUMMARY

The present disclosure has been made in view of the above-described circumstances, and provides a display device for a vehicle, a display method for a vehicle and a storage medium that may avoid the disappearance of an object, which exists at the periphery of the vehicle, from a combined image.

A display device for a vehicle relating to a first aspect includes: a rear imaging section that captures images rearward of the vehicle; a rear lateral imaging section that captures images laterally rearward of the vehicle; and a control section that generates a combined image in which a rear processed image, which is obtained by processing a rear image captured by the rear imaging section in accordance with a first predetermined parameter, and rear lateral processed images, which are obtained by processing rear lateral images captured by the rear lateral imaging section in accordance with a second predetermined parameter, are combined into a single image, and that causes a display unit to display the combined image, wherein the control section includes: an identification section that identifies an object that exists in at least one of the rear image or the rear lateral images; an acquisition section that acquires relative information of the object that includes relative position and relative speed of the object identified by the identification section with respect to the vehicle, and includes blind spot regions of the combined image that are regions that are not depicted in the combined image and that are formed in conjunction with generation of the combined image; and a changing section that, in a case of determining, on the basis of the relative information of the object acquired by the acquisition section, that the identified object will disappear from the combined image due to the identified object entering into the blind spot regions, changes the blind spot regions by adjusting the first and second predetermined parameters such that the identified object does not disappear from the combined image.

In the first aspect, in a case in which it is determined that the object, which exists in at least one of the rear image or the rear lateral images, will disappear from the combined image due to the object entering into a blind spot region, the blind spot regions are changed such that the object does not disappear from the combined image. Due thereto, it is possible to avoid the object from entering into a blind spot region of the combined image, and therefore, it is possible to avoid an object that exists in the periphery of the vehicle from disappearing from the combined image.

A second aspect is a display device according to the first aspect, wherein the changing section determines whether or not the identified object will disappear from the combined image on the basis of a positional relationship between the blind spot region and a virtual object having a starting point that is a relative position of the identified object with respect to the vehicle and an ending point that is a position that is apart from the starting point by a distance that is set in accordance with the relative speed of the identified object with respect to the vehicle in a direction of the relative speed.

In accordance with the second aspect, even in a case in which the relative speed between the vehicle and the object is large, it is possible to avoid the object that exists in the periphery of the vehicle from disappearing from the combined image due to a reason such as a lag in processing or the like.

A third aspect is a display device according to the first aspect or the second aspect, wherein the control section cuts-out the rear processed image from the rear image and cuts-out the rear lateral processed images from the rear lateral images such that the rear processed image and the rear lateral processed images contact and are connected seamlessly on a virtual plane, which is set at a position that intersects an axis extending in a longitudinal direction of the vehicle, and which is apart, by a predetermined distance, from a rear end of the vehicle, the predetermined distance that prescribes the virtual plane is set to a fixed value, and the adjusting the first and second predetermined parameters by the changing section includes adjustment of a cut-out image angle, at which the rear processed image is cut-out from the rear image, and a cut-out image angle, at which the rear lateral processed images are cut-out from the rear lateral images.

In accordance with the third aspect, in a mode in which the predetermined distance that prescribes the virtual plane is fixed, the blind spot regions may be changed by the simple processing of adjusting the cut-out image angles at which the images are cut-out from the rear image and the rear lateral images.

A fourth aspect is a display device according to the first aspect or the second aspect, wherein the control section cuts-out the rear processed image from the rear image and cuts-out the rear lateral processed images from the rear lateral images such that the rear processed image and the rear lateral processed images contact and are connected seamlessly on a virtual plane, which is set at a position that intersects an axis extending in a longitudinal direction of the vehicle, and which is apart, by a predetermined distance, from a rear end of the vehicle, and the adjusting the first and second predetermined parameters by the changing section includes adjustment of the predetermined distance that prescribes the virtual plane.

In accordance with the fourth aspect, the blind spot regions may be changed by the simple processing of adjusting the predetermined distance that prescribes the virtual plane.

A fifth aspect is a display device according to the third aspect, wherein in a case in which the identified object is approaching the vehicle, the changing section adjusts the cut-out image angles such that the blind spot regions move away from an axis that extends in the longitudinal direction of the vehicle, and, in a case in which the identified object is moving away from the vehicle, the changing section adjusts the cut-out image angles such that the blind spot regions move in directions approaching an axis that extends in the longitudinal direction of the vehicle.

In accordance with the fifth aspect, in a mode in which the blind spot regions are changed by adjusting the cut-out image angles at which images are cut-out from the rear image and the rear lateral images, it is possible to avoid an object from entering into a blind spot region both in cases in which the vehicle is overtaken by the object and in cases in which the vehicle overtakes the object.

A sixth aspect is a display device according to the fourth aspect, wherein in a case in which the identified object is approaching the vehicle, the changing section adjusts the predetermined distance that prescribes the virtual plane such that the predetermined distance becomes smaller, and, in a case in which the identified object is moving away from the vehicle, the changing section adjusts the predetermined distance that prescribes the virtual plane such that the predetermined distance becomes larger.

In accordance with the sixth aspect, in a mode in which the blind spot regions are changed by adjusting the predetermined distance that prescribes the virtual plane, it is possible to avoid an object from entering into a blind spot region both in cases in which the vehicle is overtaken by the object and in cases in which the vehicle overtakes the object.

A seventh aspect of the present disclosure is a display method for a vehicle that includes a rear imaging section that captures images rearward of a vehicle, a rear lateral imaging section that captures images laterally rearward of the vehicle, and a display unit, the method including: generating a combined image in which a rear processed image, which is obtained by processing a rear image captured by the rear imaging section in accordance with a first predetermined parameter, and rear lateral processed images, which are obtained by processing rear lateral images captured by the rear lateral imaging section in accordance with a second predetermined parameter, are combined into a single image; and displaying the combined image at the display unit, wherein generating the combined image includes: identifying an object that exists in at least one of the rear image or the rear lateral images; acquiring relative information of the object that includes relative position and relative speed of the identified object with respect to the vehicle, and includes blind spot regions of the combined image that are regions that are not depicted in the combined image and that are formed in conjunction with the generating the combined image; on the basis of the acquired relative information of the object, determining whether or not the identified object will disappear from the combined image due to the identified object entering into the blind spot regions; and in a case of determining that the identified object will disappear, changing the blind spot regions by adjusting the first and second predetermined parameters such that the identified object does not disappear from the combined image.

An eighth aspect of the present disclosure is a non-transitory storage medium that stores a program executable by a computer to perform displaying processing at a vehicle that includes a rear imaging section that captures images rearward of a vehicle, a rear lateral imaging section that captures images laterally rearward of the vehicle, and a display unit, the displaying processing including: generating a combined image in which a rear processed image, which is obtained by processing a rear image captured by the rear imaging section to processing in accordance with a first predetermined parameter, and rear lateral processed images, which are obtained by processing rear lateral images captured by the rear lateral imaging section in accordance with a second predetermined parameter, are combined into a single image; and displaying the combined image at the display unit, wherein generating the combined image includes: identifying an object that exists in at least one of the rear image or the rear lateral image; acquiring relative information of the object that includes relative position and relative speed of the identified object with respect to the vehicle, and includes blind spot regions of the combined image that are regions that are not depicted in the combined image and that are formed in conjunction with the generating the combined image; on the basis of the acquired relative information of the object, determining whether or not the identified object will disappear from the combined image due to the identified object entering into the blind spot region; and in a case of determining that the identified object will disappear, changing the blind spot regions by adjusting the first and second predetermined parameters such that the identified object does not disappear from the combined image.

In accordance with the present aspects, it is possible to avoid an object that exists in a periphery of the vehicle from disappearing from a combined image.

DETAILED DESCRIPTION

Examples of embodiments of the present disclosure are described in detail hereinafter with reference to the drawings.

First Embodiment

Figure 1:
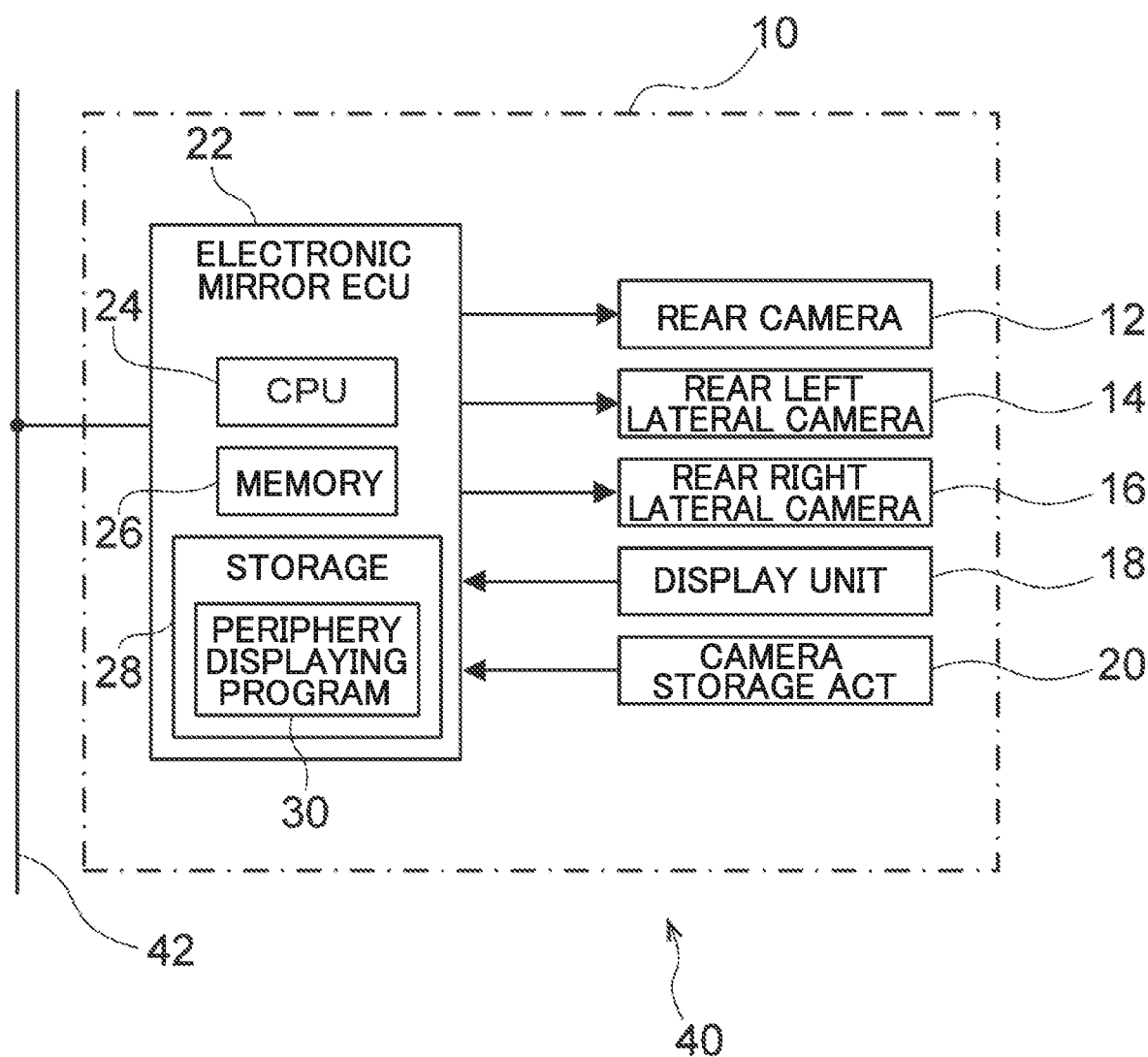
FIG. 1 is a block drawing illustrating the schematic structure of an electronic mirror device relating to an embodiment.

An onboard system 40 illustrated in FIG. 1 includes a bus 42. Plural electronic control units, which carry out controls that differ from one another, and plural sensor units are respectively connected to the bus 42. Note that only the portions of the onboard system 40 that relate to the present disclosure are illustrated in FIG. 1. Each of the electronic control units is a control unit that includes a Central Processing Unit (CPU), memories such as a Read Only Memory (ROM), a Random Access Memory (RAM) and the like, and a non-volatile storage such as a Hard Disk Drive (HDD) or a Solid State Drive (SSD) or the like, and hereinafter, these are referred to as Electronic Control Units (ECUs). An electronic mirror ECU 22 is included among the plural ECUs that are connected to the bus 42.

A rear camera 12, a rear left lateral camera 14, a rear right lateral camera 16, a display unit 18 and a camera storage actuator (ACT) 20 are respectively connected to the electronic mirror ECU 22. The electronic mirror ECU 22, the rear left lateral camera 14, the rear right lateral camera 16, the display unit 18 and the camera storage ACT 20 configure an electronic mirror device 10, and the electronic mirror device 10 is an example of the display device for a vehicle. Note that, in the electronic mirror device 10, the rear camera 12 is an example of the rear imaging section, and the rear left lateral camera 14 and the rear right lateral camera 16 are examples of the rear lateral imaging section. Further, the display unit 18 is an example of the display unit.

Figure 3:
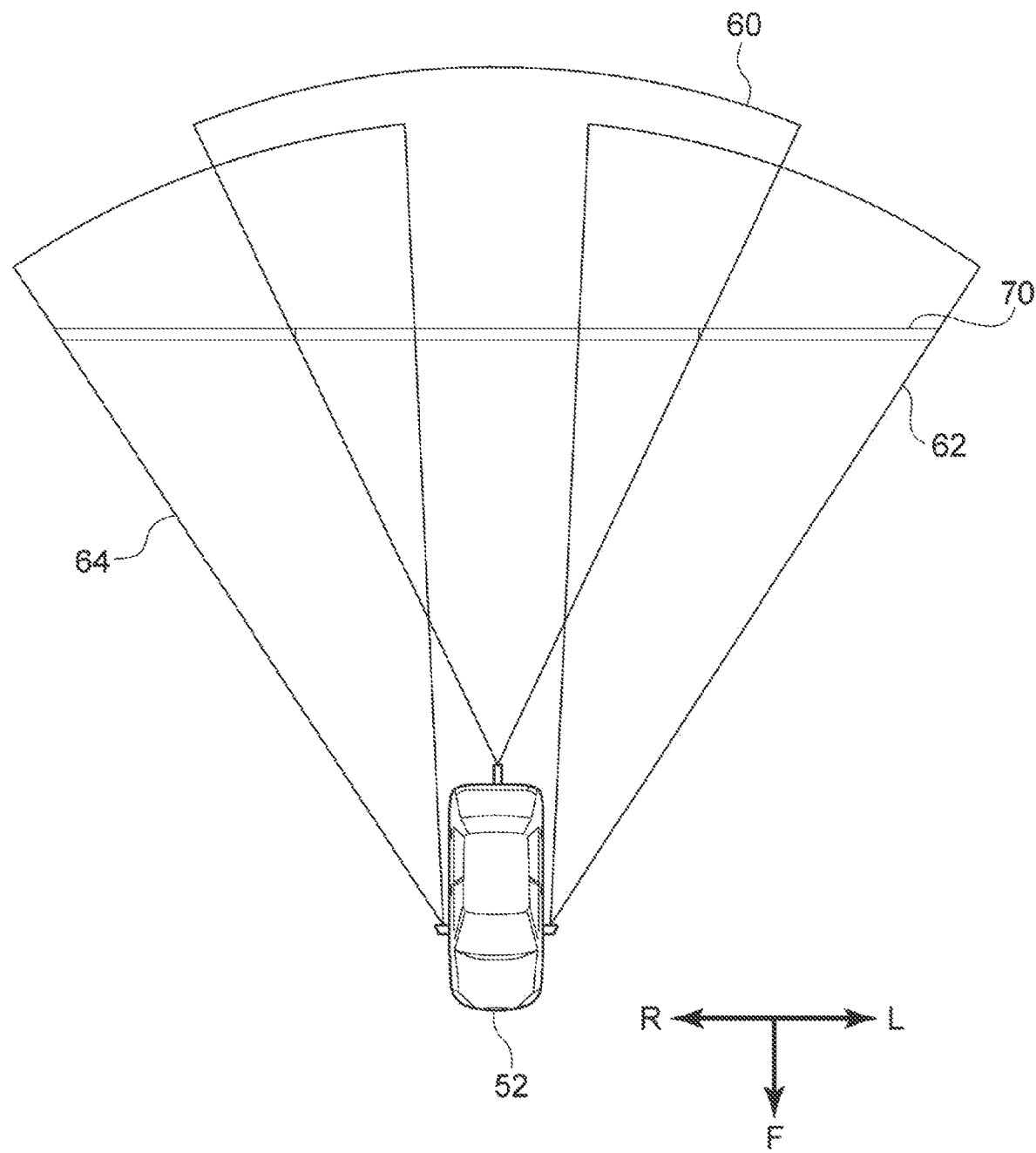
FIG. 3 is a plan view illustrating imaging ranges of cameras.

The rear camera 12 is disposed at the rear portion of a vehicle 52 (i.e., the local vehicle, see FIG. 3). The imaging optical axis (or lens) of the rear camera 12 faces toward the rear side of the vehicle 52, and the rear camera 12 captures images of the rear side of the vehicle 52. Note that it suffices for the disposed position of the rear camera 12 to be a position at which the rear camera 12 is capable to capture images of the rear side of the vehicle 52. The rear camera 12 may be disposed at the rear end portion of the vehicle 52 (e.g., in a vicinity of the rear bumper), or may be disposed so as to capture images of the rear side of the vehicle 52 through the rear windshield glass. The lens of the rear camera 12 is a fixed focus lens, and a mechanism that changes the orientation of the imaging optical axis is not provided at the rear camera 12. As an example, the rear camera 12 captures images of a fixed imaging range 60 that is illustrated in FIG. 3.

Figure 2:
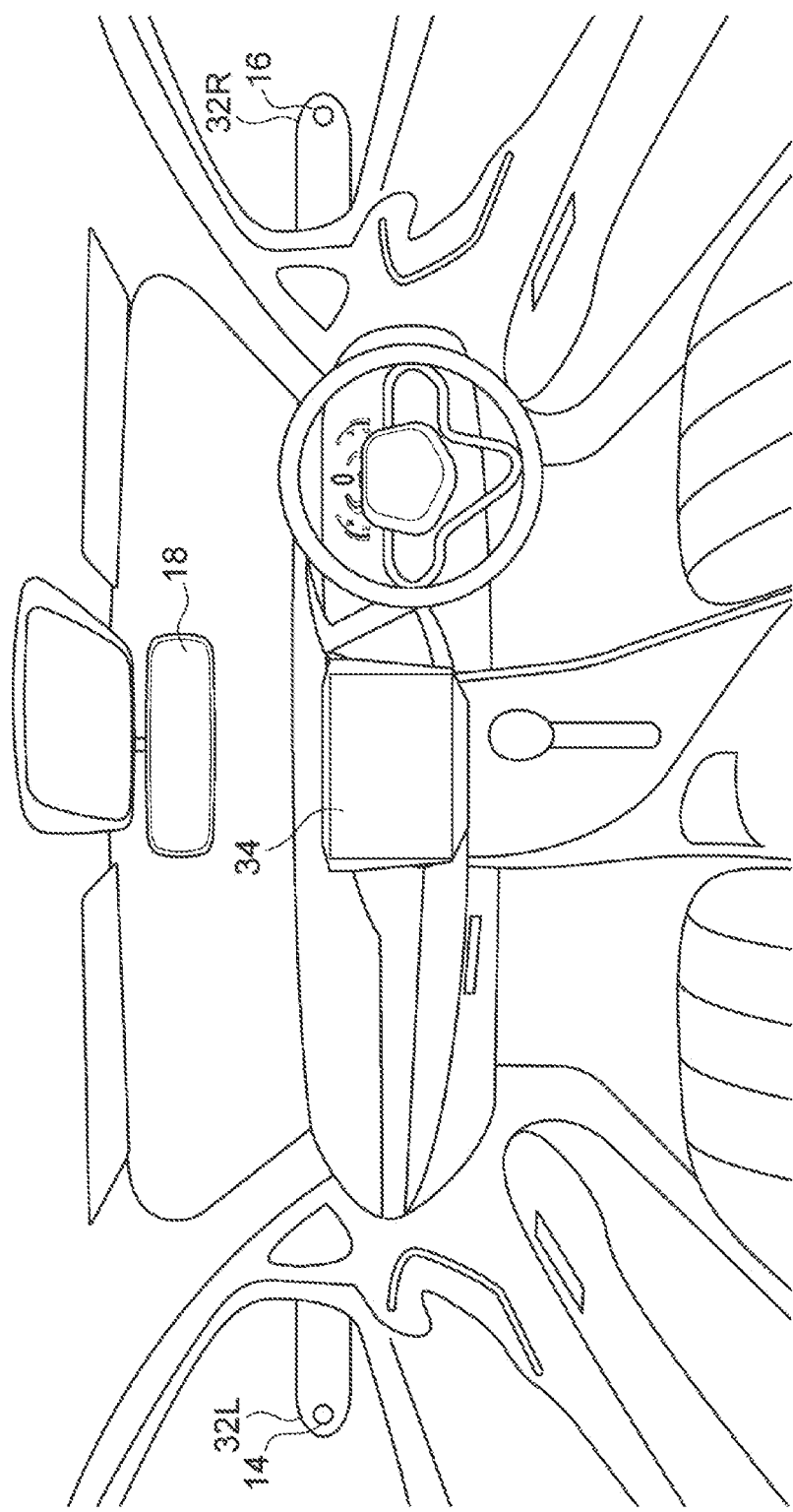
FIG. 2 is a perspective view illustrating placed positions of rear lateral cameras and a display unit of the electronic mirror device.

As illustrated in FIG. 2, a proximal portion of a camera supporting body 32L, which is substantially parallelepiped and whose distal end portion is arc-shaped, is mounted to the vehicle front side end portion of a vehicle vertical direction intermediate portion of a left side door (i.e., front side door, not illustrated) of the vehicle 52, such that the distal end portion of the camera supporting body 32L projects-out toward the outer side of the vehicle 52. The rear left lateral camera 14 is mounted to a vicinity of the distal end portion of the camera supporting body 32L. The imaging optical axis (or lens) of the rear left lateral camera 14 faces toward the rear left side of the vehicle 52, and the rear left lateral camera 14 captures images of the rear left side of the vehicle 52. The camera supporting body 32L is capable of rotating in the longitudinal direction of the vehicle 52. Due to the driving force of the camera storage ACT 20, the camera supporting body 32L is rotated to a stored position, at which the length direction of the camera supporting body 32L runs approximately along the outer side surface of the vehicle 52, or an operation position at which the rear left lateral camera 14 images the rear left side of the vehicle 52.

The lens of the rear left lateral camera 14 is a fixed focus lens, and a mechanism that changes the orientation of the imaging optical axis is not provided at the rear left lateral camera 14. In the state in which the camera supporting body 32L is positioned at the operation position, the rear left lateral camera 14 captures images of a fixed imaging range 62 that is illustrated in FIG. 3 as an example. As illustrated in FIG. 3, a portion of the imaging range 62 of the rear left lateral camera 14 overlaps with the imaging range 60 of the rear camera 12.

A proximal portion of a camera supporting body 32R, which has a shape that has left-right symmetry with respect to that of the camera supporting body 32L, is mounted to the vehicle front side end portion of a vehicle vertical direction intermediate portion of a right side door (i.e., front side door, not illustrated) of the vehicle 52. The rear right lateral camera 16 is mounted to a vicinity of the distal end portion of the camera supporting body 32R. The imaging optical axis (or lens) of the rear right lateral camera 16 faces toward the rear right side of the vehicle 52, and the rear right lateral camera 16 captures images of the rear right side of the vehicle 52. The camera supporting body 32R is also capable of rotating in the vehicle longitudinal direction. Due to the driving force of the camera storage ACT 20, the camera supporting body 32R is rotated to a stored position, at which the length direction of the camera supporting body 32R runs approximately along the outer side surface of the vehicle 52, or an operation position at which the rear right lateral camera 16 images the rear right side of the vehicle 52.

The lens of the rear right lateral camera 16 is a fixed focus lens, and a mechanism that changes the orientation of the imaging optical axis is not provided at the rear right lateral camera 16. In the state in which the camera supporting body 32R is positioned at the operation position, the rear right lateral camera 16 captures images of a fixed imaging range 64 that is illustrated in FIG. 3 as an example. As illustrated in FIG. 3, a portion of the imaging range 64 of the rear right lateral camera 16 overlaps with the imaging range 60 of the rear camera 12.

A central monitor 34 is provided at the central portion of the instrument panel of the vehicle 52, and the display unit 18 is provided at a position that is apart, toward the vehicle upper side, from the central monitor 34. Due to the electronic mirror ECU 22, the display unit 18 displays an image (i.e., a combined image) that combines the rear image (i.e., video image) captured by the rear camera 12, the rear left lateral image (i.e., video image) captured by the rear left lateral camera 14, and the rear right lateral image (i.e., video image) captured by the rear right lateral camera 16.

Figure 4:
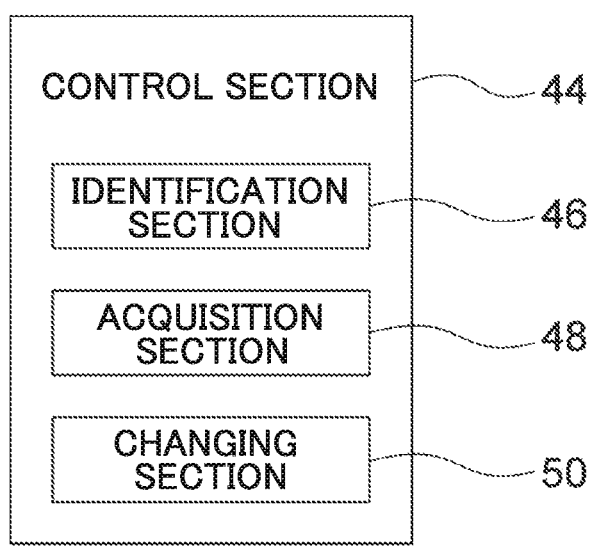
FIG. 4 is a functional block drawing of the electronic mirror ECU.

As illustrated in FIG. 1, the electronic mirror ECU 22 includes a CPU 24, memories 26 such as a ROM, a RAM and the like, and a non-volatile storage 28 such as an HDD, an SSD or the like. A periphery displaying program 30 is stored in the storage 28. Due to the periphery displaying program 30 being read-out from the storage 28 and loaded on the memory 26, and the periphery displaying program 30 loaded on the memory 26 being executed by the CPU 24, the electronic mirror ECU 22 functions as a control section 44 illustrated in FIG. 4, and carries out periphery displaying processing that is described later.

The control section 44 generates a combined image that combines, into a single image, a rear processed image that is obtained by performing processing on the rear image captured by the rear camera 12 in accordance with predetermined parameters, and rear lateral processed images that are obtained by performing processing on the rear lateral images captured by the rear lateral cameras 14, 16 in accordance with predetermined parameters. Then, the control section 44 causes the display unit 18 to display the generated combined image.

Further, the control section 44 includes an identification section 46, an acquisition section 48 and a changing section 50. The identification section 46 identifies an object such as another vehicle or the like that exists in at least one of the rear image or the rear lateral image. The acquisition section 48 acquires relative information of the object. The relative information of the object includes the relative position and the relative speed of the object identified by the identification section 46 with respect to the vehicle 52, and blind spot regions of the combined image that are regions that are not depicted in the combined image and that arise accompanying the generation of the combined image.

On the basis of the relative information of the object acquired by the acquisition section 48, the changing section 50 carries out the following processing in a case in which it is determined that an identified object will disappear from the combined image due to the identified object entering into a blind spot region. Namely, the changing section 50 changes the blind spot regions by adjusting predetermined parameters, such that the identified object does not disappear from the combined image.

Figure 5:
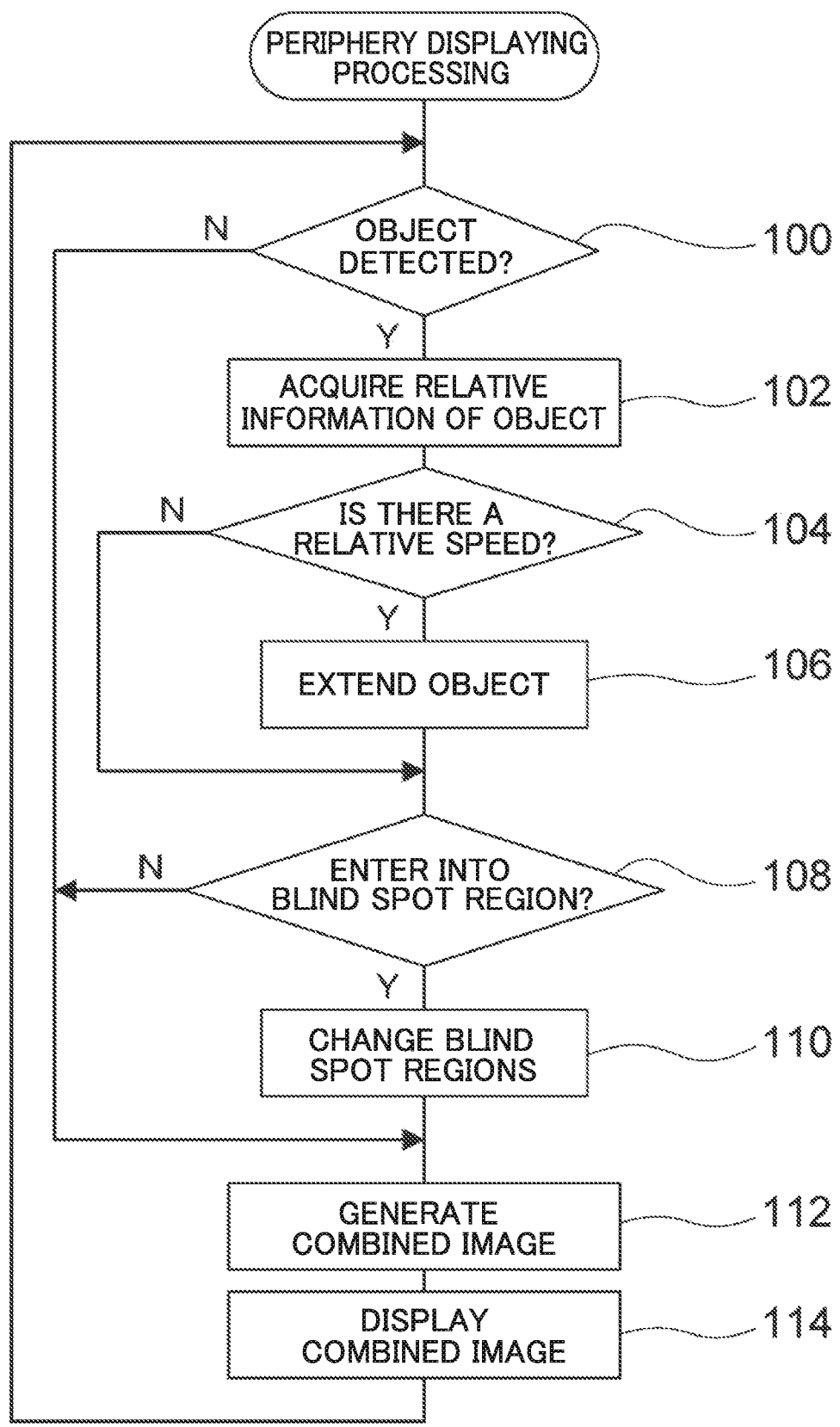
FIG. 5 is a flowchart illustrating periphery displaying processing that is executed by the electronic mirror ECU.

As the operation of the first embodiment, the periphery displaying processing that is executed by the electronic mirror ECU 22 is described next with reference to FIG. 5. In step 100 of the periphery displaying processing, the identification section 46 identifies an object such as another vehicle or the like that exists in at least one of the rear image or the rear lateral images, and determines whether or not an object is detected in at least one of the rear image or the rear lateral images.

If the identification section 46 does not detect an object, the determination in step 100 is negative, and the routine moves on to step 112. In step 112, the control section 44 generates a combined image from the rear image and the rear lateral images.

Figure 6:
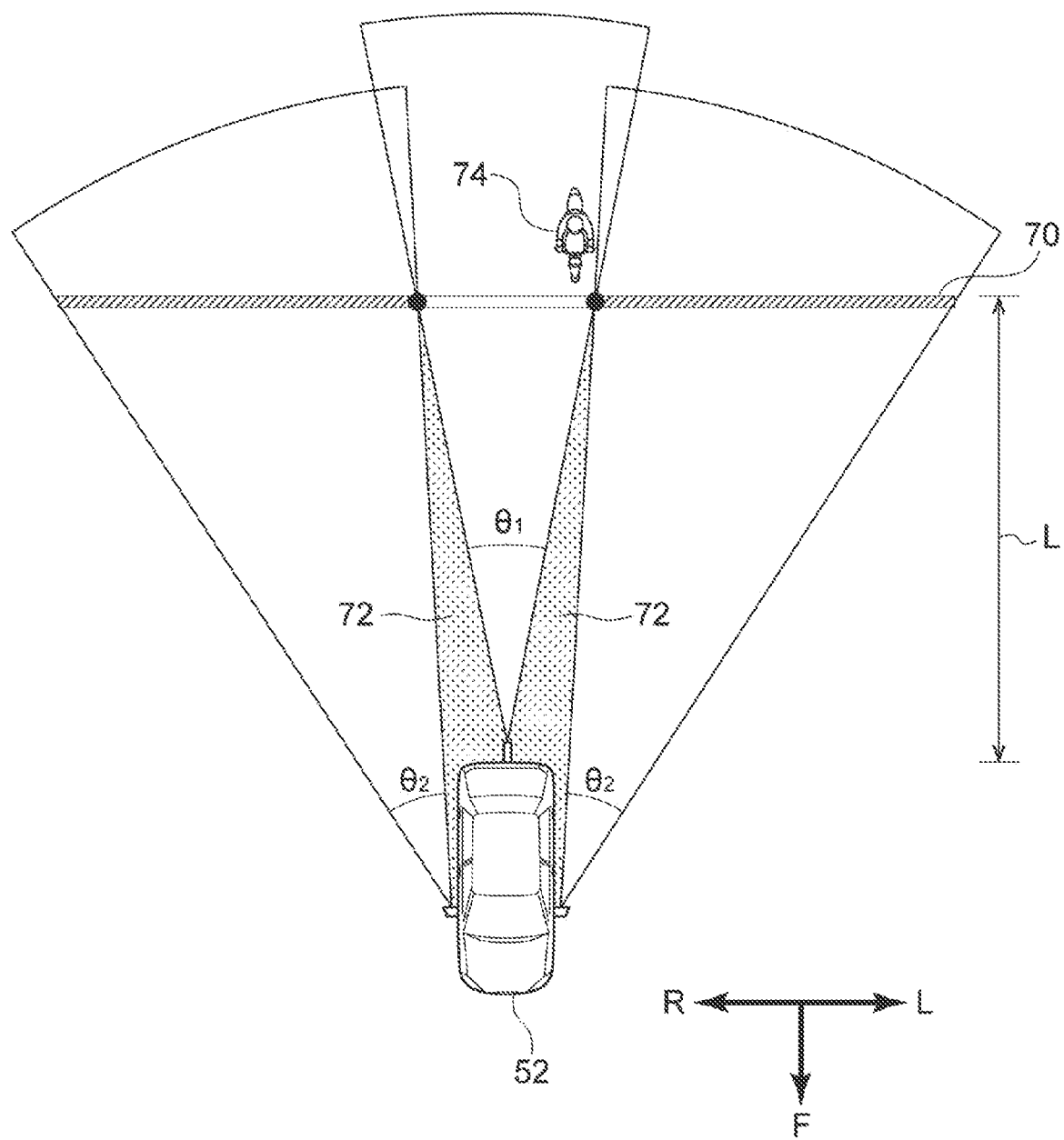
FIG. 6 is a plan view illustrating a situation in which an object (i.e., a motorcycle) is approaching from the vehicle rear side.

Namely, as illustrated in FIG. 6, the control section 44 sets a virtual plane 70 at a position that intersects an axis extending in the longitudinal direction of the vehicle 52 and that is apart, by a predetermined distance L, from the rear end of the vehicle 52. Note that, in the first embodiment, the predetermined distance L is fixed. Further, the control section 44 cuts-out a rear processed image from the rear image at a predetermined cut-out image angle $\theta_1$, and cuts-out rear lateral processed images from the rear lateral images at a predetermined cut-out image angle $\theta_2$, such that the rear processed image and the rear lateral processed images contact and are connected seamlessly on the virtual plane 70. Then, the control section 44 combines the rear processed image that is cut-out from the rear image and the rear lateral processed images that are cut-out from the rear lateral images, and generates a combined image.

Note that the predetermined cut-out image angles $\theta_1$, $\theta_2$ are determined in accordance with the positions of the seams of the rear processed image and the rear lateral processed images on the virtual plane 70. The predetermined cut-out image angles $\theta_1$, $\theta_2$ are examples of the predetermined parameters.

In next step 114, the control section 44 causes the display unit 18 to display the combined image. The combined image is an image in which the region of the rear image, the region of the rear left lateral image, and the region of the rear right lateral image are connected smoothly, and is an image that is close to that in a case in which an occupant of the vehicle 52 views the rear side and the rear lateral sides of the vehicle 52. Accordingly, a vehicle occupant who is viewing the combined image displayed on the display unit 18 may smoothly identify the situation at the rear side and the rear lateral sides of the vehicle 52.

On the other hand, in a case in which the identification section 46 detects an object, the determination in step 100 is affirmative, and the routine moves on to step 102. In step 102, the acquisition section 48 acquires relative information of the object. The relative information of the object includes information of the relative position, the relative speed and the direction of the object identified by the identification section 46 with respect to the vehicle 52, and the blind spot regions in the combined image, which are regions that are not depicted in the combined image and that arise accompanying the generation of the combined image. The acquisition section 48 derives the relative position, the relative speed and the direction of the object on the basis of the position of the image region corresponding to the object and changes thereto, and the size of the image region corresponding to the object and changes thereto, in at least one of the rear image or the rear lateral images.

An example of blind spot regions 72 in the combined image is illustrated in FIG. 6. The boundary positions and the sizes of the blind spot regions 72 are determined based on the positional relationship between three points that are the position of the rear camera 12, the position of the rear lateral camera 14, 16, and the position of the seam between the rear processed image and the rear lateral processed image on the virtual plane 70 (hereinafter called "position of image seam"). In the first embodiment, the position of the rear camera 12, the positions of the rear lateral cameras 14, 16 and the position of the virtual plane 70 are fixed.

Therefore, the boundary positions of and the sizes of the blind spot regions 72 corresponding to various positions of the seams of the images, and the predetermined cut-out image angles $\theta_1$, $\theta_2$ are respectively stored in the storage 28 of the electronic mirror ECU 22. Note that the values of the predetermined cut-out image angles $\theta_1$, $\theta_2$ are adjusted in accordance with the positions of the seams of the image, such that the rear processed image and the rear lateral processed images contact and are connected seamlessly on the virtual plane 70. The acquisition section 48 acquires, from the storage 28, the boundary positions and sizes of the blind spot regions 72 corresponding to the current positions of the seams of the images, and the predetermined cut-out image angles $\theta_1$, $\theta_2$.

In next step 104, on the basis of the relative speed of the object that is included in the relative information of the object acquired by the acquisition section 48, the changing section 50 determines whether or not there is a relative speed between the object and the vehicle 52 (i.e., whether or not the relative speed is other than zero). If the determination in step 104 is affirmative, the routine moves on to step 106.

In step 106, the changing section 50 models the object into a virtual object that is shaped as a vector whose starting point is the relative position of the object with respect to the vehicle 52 and whose ending point is a position that is apart from this starting point by a distance that is set in accordance with the relative speed of the object with respect to the vehicle 52 in the direction of the relative speed of the object. Note that, for example, a distance that is obtained by multiplying, by the relative speed of the object, the time which is the sum of the processing cycle of the periphery displaying processing and a margin (i.e., a predetermined value), may be used as the aforementioned "distance that is set in accordance with the relative speed".

Figure 7:
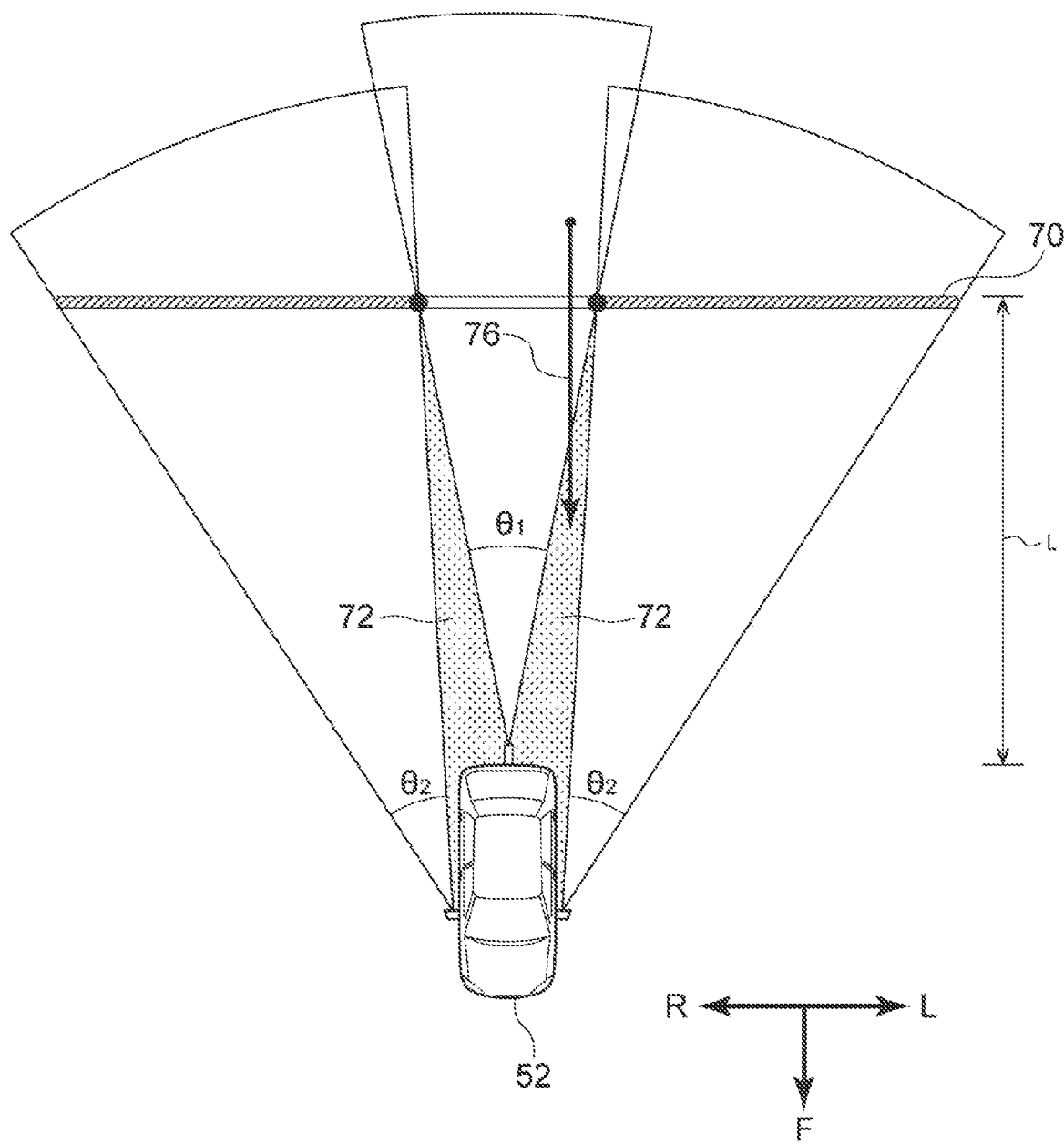
FIG. 7 is a plan view illustrating a virtual object that represents the object (the motorcycle) illustrated in FIG. 6.

As an example, as illustrated in FIG. 6, a motorcycle 74 exists at the rear of the vehicle 52. In a case in which the motorcycle 74 is approaching the vehicle 52, the motorcycle 74 is represented by a virtual object 76 illustrated in FIG. 7. When the processing of step 106 is carried out, the routine moves on to step 108. Note that FIG. 7 illustrates an example in which the virtual object 76 is approximately parallel to an axis extending in the longitudinal direction of the vehicle 52. However, in a case in which, for example, the object corresponding to the virtual object 76 is changing lanes or the like, there are cases in which the virtual object 76 is inclined with respect to an axis running along the longitudinal direction of the vehicle 52.

On the other hand, if the determination in step 104 is negative, the routine skips step 106 and moves on to step 108. In this case, the virtual object that models the object is the shape of a dot that is positioned at the relative position of the object with respect to the vehicle 52.

In step 108, on the basis of the position and the size of the blind spot region 72 that are included in the relative information of the object acquired by the acquisition section 48, the changing section 50 determines whether or not a virtual object that is vector-shaped or dot-shaped is overlapping the blind spot region 72 (i.e., has entered into the blind spot region 72).

As an example, as illustrated in FIG. 6, in a case in which the motorcycle 74 exists at the rear of the vehicle 52, and the relative speed of the motorcycle 74 with respect to the vehicle 52 is 0, a dot-shaped virtual object that represents the motorcycle 74 is positioned outside of the blind spot region 72. In this case, the determination in step 108 is negative, and the routine skips step 110 and moves on to step 112.

On the other hand, as illustrated in FIG. 6, in a case in which the motorcycle 74 exists at the rear of the vehicle 52, and the motorcycle 74 is approaching the vehicle 52, as illustrated in FIG. 7 as an example, a situation may arise in which the vector-shaped virtual object 76 that corresponds to the motorcycle 74 overlaps the blind spot region 72. If the virtual object 76 is overlapping the blind spot region 72, there is a high possibility that the corresponding object (the motorcycle 74 in this case) will disappear from the combined image during the time period until the next processing cycle.

Figure 9:
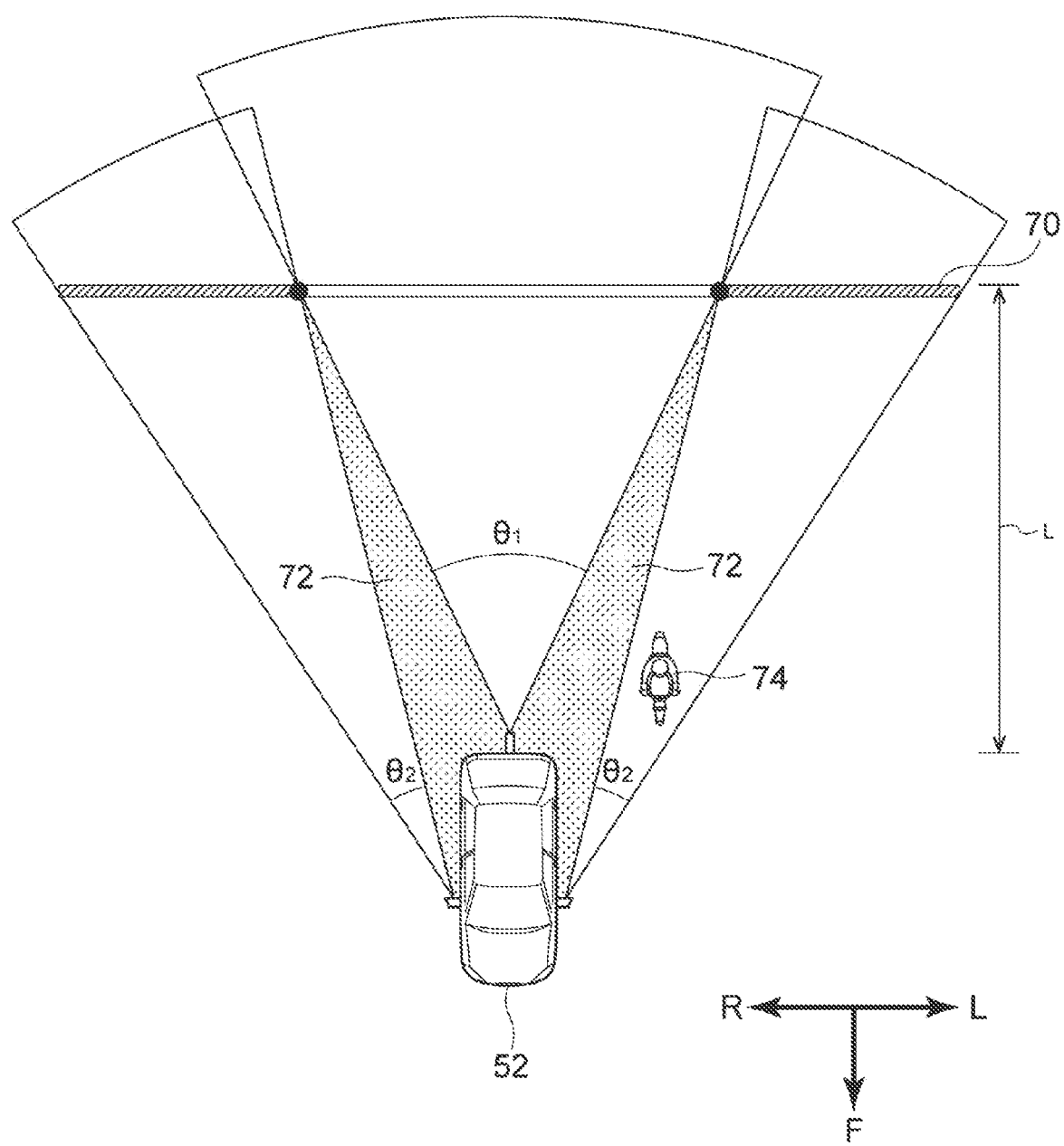
FIG. 9 is a plan view illustrating a situation in which the object (the motorcycle) moves away from a rear lateral side of the vehicle.

Further, as illustrated in FIG. 9, also in a case in which the motorcycle 74 exists at the rear left lateral side of the vehicle 52, and the motorcycle 74 is moving away from the vehicle 52, a situation may arise in which the vector-shaped virtual object 76 overlaps the blind spot region 72. If the virtual object 76 is overlapping the blind spot region 72, there is a high possibility that the corresponding object (the motorcycle 74 in this case) will disappear from the combined image during the time period until the next processing cycle.

Therefore, if the determination in step 108 is affirmative, the routine moves on to step 110. In step 110, the changing section 50 changes the boundary positions and the sizes of the blind spot regions 72 by changing the positions of the seams of the image and changing the predetermined cut-out image angles $\theta_1$, $\theta_2$, such that the vector-shaped or dot-shaped virtual object does not overlap the blind spot region 72.

Figure 8:
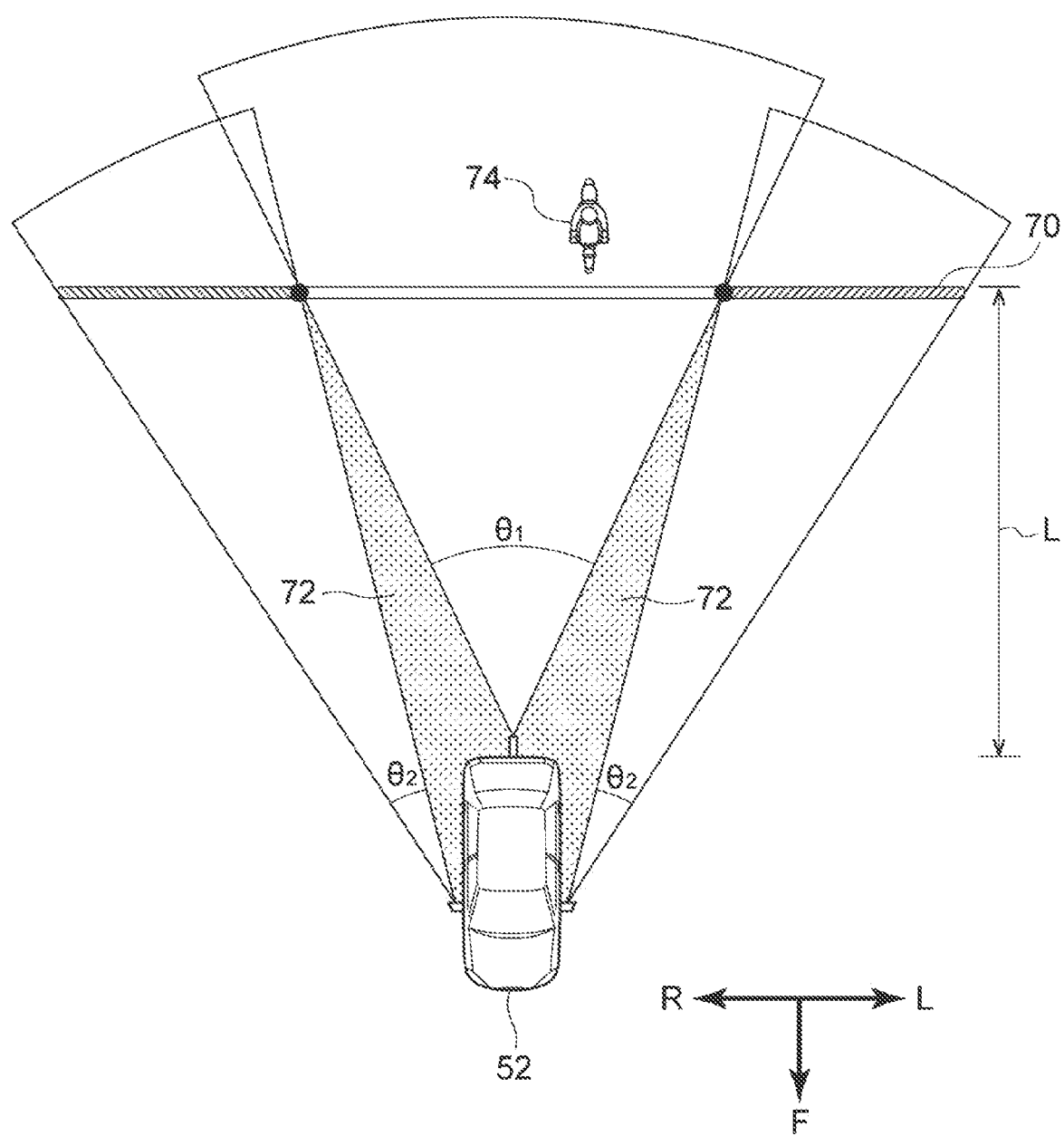
FIG. 8 is a plan view illustrating a situation in which cut-out image angles are changed in accordance with the entry of the object (the motorcycle) illustrated in FIG. 6 into a blind spot region.

For example, as illustrated in FIGS. 6 and 7, if the virtual object 76 that corresponds to the motorcycle 74 that is approaching the vehicle 52 is overlapping the blind spot region 72, as illustrated in FIG. 8, the changing section 50 moves the positions of the seams of the images in directions of moving apart from an axis that extends along the longitudinal direction of the vehicle 52. Accompanying this, the changing section 50 increases the predetermined cut-out image angle $\theta_1$ and decreases the predetermined cut-out image angles $\theta_2$ such that the blind spot regions 72 move in directions of moving away from an axis that extends in the longitudinal direction of the vehicle 52. Due thereto, the overlapping of the virtual object and the blind spot region is eliminated, and the motorcycle 74 is avoided from disappearing from the combined image that is generated in step 112.

Figure 10:
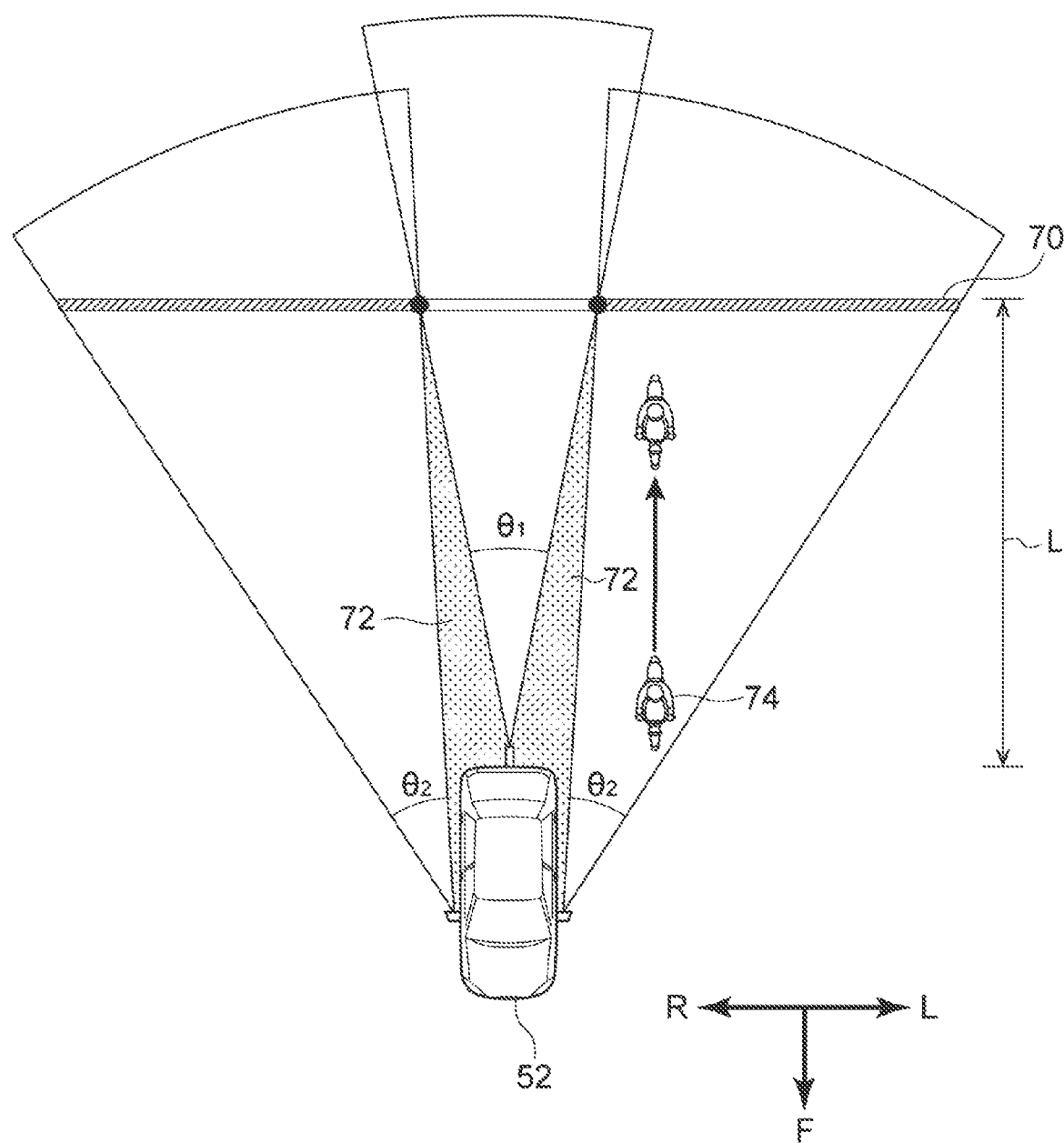
FIG. 10 is a plan view illustrating a situation in which the cut-out image angles are changed in accordance with the entry of the object (the motorcycle) illustrated in FIG. 9 into a blind spot region.

Further, for example, as illustrated in FIG. 9, if the virtual object 76 that corresponds to the motorcycle 74 that is moving away from the vehicle 52 overlaps the blind spot region 72, as illustrated in FIG. 10, the changing section 50 moves the positions of the seams of the image in directions of approaching an axis that extends along the longitudinal direction of the vehicle 52. Accompanying this, the changing section 50 decreases the predetermined cut-out image angle $\theta_1$ and increases the predetermined cut-out image angles $\theta_2$ such that the blind spot regions 72 move in directions of approaching an axis that extends in the longitudinal direction of the vehicle 52. Due thereto, the overlapping of the virtual object and the blind spot region is eliminated, and the motorcycle 74 is avoided from disappearing from the combined image that is generated in step 112.

Note that, in a case in which plural objects are detected, a priority order may be set for the plural objects in the order of their proximity to the vehicle 52, and the positions of the seams of the images may be moved and the blind spot regions 72 may be moved such that an object that is high in the priority order does not disappear from the combined image.

In this way, in the first embodiment, the control section 44 generates a combined image that combines, into a single image, a rear processed image that is obtained by performing processing on the rear image captured by the rear camera 12 in accordance with predetermined parameters, and rear lateral processed images that are obtained by performing processing on the rear lateral images captured by the rear lateral cameras 14, 16 in accordance with predetermined parameters. Then, the control section 44 causes the display unit 18 to display the combined image that has been generated. The control section 44 includes the identification section 46, the acquisition section 48 and the changing section 50. The identification section 46 identifies an object such as another vehicle or the like that exists in at least one of the rear image or the rear lateral images. The acquisition section 48 acquires relative information of the object that includes the relative position and the relative speed of the object identified by the identification section 46 with respect to the vehicle 52, and blind spot regions of the combined image that are regions that are not depicted in the combined image and that arise accompanying the generating of the combined image. On the basis of the relative information of the object acquired by the acquisition section 48, the changing section 50 carries out the following processing in a case in which it is determined that an identified object will disappear from the combined image due to the identified object entering into a blind spot region. Namely, the changing section 50 changes the blind spot regions by adjusting predetermined parameters, such that the identified object does not disappear from the combined image. Due thereto, an object is avoided from entering into a blind spot region of the combined image, and therefore, an object that exists in the periphery of the vehicle 52 may be avoided from disappearing from the combined image.

Further, in the first embodiment, the changing section 50 determines the virtual object 76 whose starting point is the relative position of the identified object with respect to the vehicle 52 and whose ending point is a position that is apart from this starting point by a distance that is set in accordance with the relative speed of the identified object with respect to the vehicle 52 in the direction of the relative speed. Then, on the basis of the positional relationship between the virtual object 76 and the blind spot region 72, it is determined whether or not the identified object will disappear from the combined image. Due thereto, even in a case in which the relative speed between the vehicle 52 and the object is large, the object that exists in the periphery of the vehicle 52 may be avoided from disappearing from the combined image due to a reason such as a lag in processing or the like.

Further, in the first embodiment, the control section 44 cuts out a rear processed image from the rear image and cuts out rear lateral processed images from the rear lateral images, such that the rear processed image and the rear lateral processed images contact and are connected seamlessly on a virtual plane which is set at a position that intersects an axis extending in the longitudinal direction of the vehicle 52 and that is apart from the rear end of the vehicle 52 by a predetermined distance. In the first embodiment, the predetermined distance L that prescribes the virtual plane 70 is set fixedly, and, as the adjustment of the predetermined parameters, the changing section 50 carries out adjustment of the cut-out image angle $\theta_1$ at which the rear processed image is cut-out from the rear image, and the cut-out image angle $\theta_2$ at which the rear lateral processed images are cut-out from the rear lateral images. Due thereto, the blind spot regions may be changed by the simple processing of adjusting the cut-out image angles $\theta_1$, $\theta_2$ of the images from the rear image and the rear lateral images.

Further, in the first embodiment, in a case in which the identified object is approaching the vehicle 52, the changing section 50 adjusts the cut-out image angles $\theta_1$, $\theta_2$ such that the blind spot regions 72 move in directions of moving away from an axis that extends in the longitudinal direction of the vehicle 52. Further, in a case in which the identified object is moving away from the vehicle 52, the changing section 50 adjusts the cut-out image angles $\theta_1$, $\theta_2$ such that the blind spot regions 72 move in directions of approaching an axis that extends in the longitudinal direction of the vehicle 52. Due thereto, an object may be avoided from entering into a blind spot region both in cases in which the vehicle 52 is overtaken by the object and in cases in which the vehicle 52 overtakes the object.

Second Embodiment

A second embodiment of the present disclosure is described next. Note that, because the second embodiment has a similar structure as the first embodiment, the respective portions are denoted by the same reference numerals, and description of the structures is omitted, and only the portions that differ from the first embodiment are described.

The first embodiment describes a mode in which the blind spot regions 72 are moved by moving the seam positions of the images and, accompanying this, changing the predetermined cut-out image angles $\theta_1$, $\theta_2$. The second embodiment describes a mode in which, instead of the above, the blind spot regions 72 are moved by moving the position of the virtual plane 70.

In the second embodiment, the boundary positions of and the sizes of the blind spot regions 72 corresponding to various positions of the virtual plane 70, and the predetermined cut-out image angles $\theta_1$, $\theta_2$ are respectively stored in the storage 28 of the electronic mirror ECU 22. Note that the values of the predetermined cut-out image angles $\theta_1$, $\theta_2$ are adjusted in accordance with the position of the virtual plane 70, such that the rear processed image and the rear lateral processed images contact and are connected seamlessly on the virtual plane 70.

At the time of acquisition the relative information of the object in step 102, the acquisition section 48 acquires, from the storage 28, the boundary positions and the sizes of the blind spot regions 72 corresponding to the current position of the virtual plane 70, and the predetermined cut-out image angles $\theta_1$, $\theta_2$. The predetermined cut-out image angles $\theta_1$, $\theta_2$ that are acquired here are used at the time of cutting-out the rear processed image from the rear image and cutting-out the rear lateral processed images from the rear lateral images in step 112.

Further, in step 110, the changing section 50 changes the boundary positions and the sizes of the blind spot regions 72 by changing the position of the virtual plane 70 such that the object (i.e., the virtual object or the dot-shaped object) does not overlap the blind spot region 72.

Figure 11:
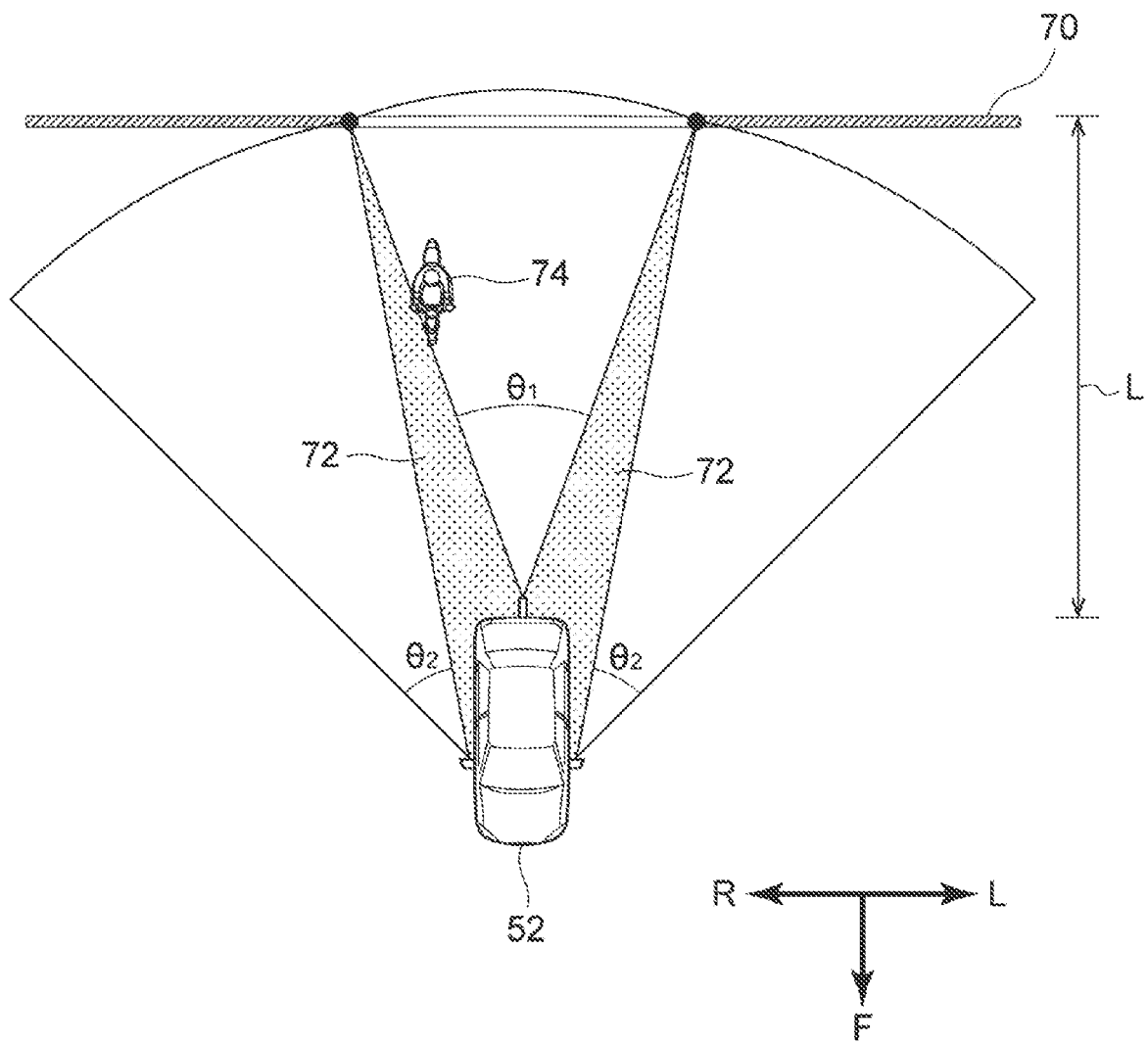
FIG. 11 is a plan view illustrating a situation in which the object (the motorcycle) is approaching from the vehicle rear side.
Figure 12:
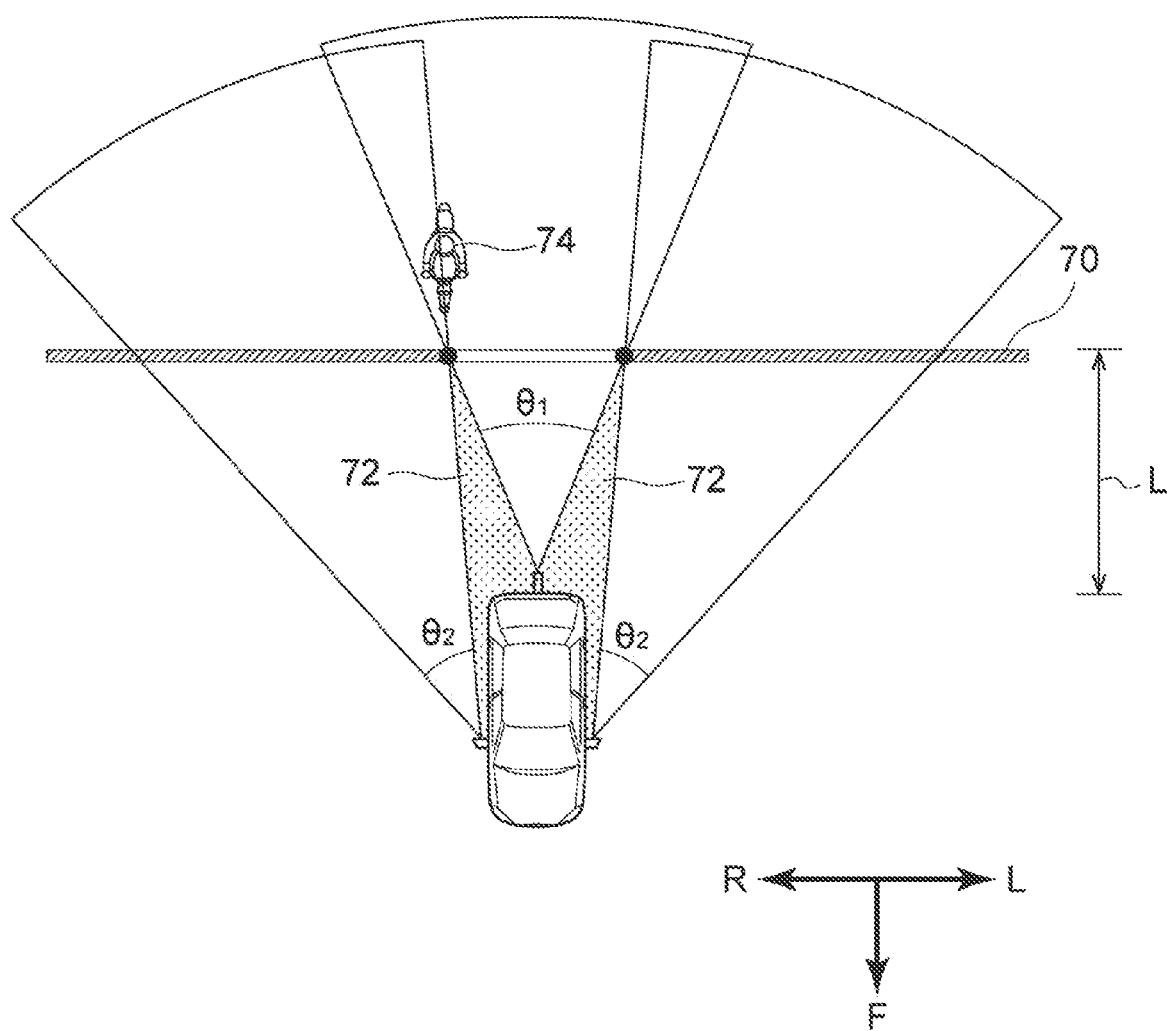
FIG. 12 is a plan view illustrating a situation in which the position of a virtual plane is changed in accordance with the entry of the object (the motorcycle) illustrated in FIG. 11 into a blind spot region.

For example, as illustrated in FIG. 11, in a case in which the virtual object 76 that corresponds to the motorcycle 74 that is approaching the vehicle 52 overlaps the blind spot region 72, as illustrated in FIG. 12, the changing section 50 adjusts the predetermined distance L that prescribes the virtual plane 70 such that the predetermined distance L becomes smaller. Accompanying this, the sizes of the blind spot regions 72 in the longitudinal direction of the vehicle 52 become smaller. Due thereto, the motorcycle 74 is avoided from disappearing from the combined image that is generated in step 112.

Further, although not illustrated, in a case in which the virtual object 76 that corresponds to the motorcycle 74 that is moving away from the vehicle 52 overlaps the blind spot region 72, the changing section 50 adjusts the predetermined distance L that prescribes the virtual plane 70 such that the predetermined distance L becomes larger. Accompanying this, the sizes of the blind spot regions 72 in the longitudinal direction of the vehicle 52 become larger. Due thereto, the overlapping of the virtual object and the blind spot region is eliminated, and the motorcycle 74 is avoided from disappearing from the combined image that is generated in step 112.

In this way, in the second embodiment, the control section 44 cuts-out a rear processed image from the rear image and cuts-out rear lateral processed images from the rear lateral images, such that the rear processed image and the rear lateral processed images contact and are connected seamlessly on the virtual plane 70 which is set at a position that intersects an axis extending in the longitudinal direction of the vehicle 52 and that is apart, by the predetermined distance L, from the rear end of the vehicle 52. Further, as the adjustment of the predetermined parameters, the changing section 50 carries out adjustment of the predetermined distance L that prescribes the virtual plane 70. Due thereto, the blind spot regions 72 may be changed by the simple processing of adjusting the predetermined distance L that prescribes the virtual plane 70.

Further, in the second embodiment, in a case in which the identified object is approaching the vehicle 52, the changing section 50 adjusts the predetermined distance L that prescribes the virtual plane 70 such that the predetermined distance L becomes smaller. Further, in a case in which the identified object is moving away from the vehicle 52, the changing section 50 adjusts the predetermined distance L that prescribes the virtual plane 70 such that the predetermined distance L becomes larger. Due thereto, an object may be avoided from entering into the blind spot region 72 both in cases in which the vehicle 52 is overtaken by the object and in cases in which the vehicle 52 overtakes the object.

Note that the above describes aspects in which the relative position, the relative speed and the direction thereof of the object are derived on the basis of the position of the image region corresponding to the object and changes thereto, and the size of that image region and changes thereto, in at least one of the rear image or the rear lateral images. However, the present disclosure is not limited to this, and the relative position, the relative speed and the direction thereof of the object may be detected by a sensor such as radar, LIDAR, sonar, or the like.

Further, the above describes aspects in which the length of the virtual object 76 (the distance from the starting point to the end point) is made to be a distance that is obtained by multiplying, by the relative speed of the object, the time which is the sum of the processing cycle of the periphery displaying processing and a margin (i.e., a predetermined value). However, the present disclosure is not limited to this. For example, the margin may be increased as the relative speed of the object increases. Alternatively, for example, the margin may be eliminated, and the length of the virtual object 76 may be made to be a distance that is obtained by multiplying, by the relative speed of the object, the processing cycle of the periphery displaying processing.

Moreover, although the above describes an aspect in which, in a case in which plural objects are detected, a priority order is set for the plural objects in the order of their proximity to the vehicle 52, the present disclosure is not limited to this. For example, by taking the relative speeds of the plural objects into consideration, the priority order of the objects may be set in the order of the earliest time at which an object will enter into the blind spot region 72. Alternatively, for example, motorcycles may be set to have higher priority than four-wheeled vehicles.

What is claimed is:

1. A display device for a vehicle, comprising:
   a rear imaging section that captures images rearward of the vehicle;
   a rear lateral imaging section that captures images laterally rearward of the vehicle;
   a memory; and
   a processor that is coupled to the memory and is configured to:
   generate a combined image in which a rear processed image, which is obtained by processing a rear image captured by the rear imaging section in accordance with a first predetermined parameter, and rear lateral processed images, which are obtained by processing rear lateral images captured by the rear lateral imaging section in accordance with a second predetermined parameter, are combined into a single image;
   display the combined image at a display unit;
   identify an object that exists in at least one of the rear image or the rear lateral images;
   acquire relative information of the object that includes relative position and relative speed of the identified object with respect to the vehicle, and includes blind spot regions of the combined image that are regions that are not depicted in the combined image and that are formed in conjunction with generation of the combined image; and
   in a case of determining, on the basis of the acquired relative information of the object, that the identified object will disappear from the combined image due to the identified object entering into the blind spot regions, change the blind spot regions by adjusting the first and second predetermined parameters such that the identified object does not disappear from the combined image.

2. The display device for a vehicle of claim 1, wherein the processor is further configured to determine whether or not the identified object will disappear from the combined image on the basis of a positional relationship between the blind spot region and a virtual object having a starting point that is a relative position of the identified object with respect to the vehicle and an ending point that is a position that is apart from the starting point by a distance that is set in accordance with the relative speed of the identified object with respect to the vehicle in a direction of the relative speed.

3. The display device for a vehicle of claim 1, wherein the processor is further configured to:
   cut out the rear processed image from the rear image and cut out the rear lateral processed images from the rear lateral images such that the rear processed image and the rear lateral processed images contact and are connected seamlessly on a virtual plane, which is set at a position that intersects an axis extending in a longitudinal direction of the vehicle, and which is apart, by a predetermined distance, from a rear end of the vehicle, wherein the predetermined distance that prescribes the virtual plane is set to a fixed value; and
   adjust the first and second predetermined parameters by adjusting a cut-out image angle, at which the rear processed image is cut out from the rear image, and a cut-out image angle, at which the rear lateral processed images are cut out from the rear lateral images.

4. The display device for a vehicle of claim 1, wherein the processor is further configured to:
   cut out the rear processed image from the rear image and cut out the rear lateral processed images from the rear lateral images such that the rear processed image and the rear lateral processed images contact and are connected seamlessly on a virtual plane, which is set at a position that intersects an axis extending in a longitudinal direction of the vehicle, and which is apart, by a predetermined distance, from a rear end of the vehicle; and adjust the first and second predetermined parameters by adjusting the predetermined distance that prescribes the virtual plane.

5. The display device for a vehicle of claim 3, wherein the processor is further configured to, in a case in which the identified object is approaching the vehicle, adjust the cut-out image angles such that the blind spot regions move away from an axis that extends in the longitudinal direction of the vehicle, and, in a case in which the identified object is moving away from the vehicle, adjust the cut-out image angles such that the blind spot regions move in directions approaching an axis that extends in the longitudinal direction of the vehicle.

6. The display device for a vehicle of claim 4, wherein the processor is further configured to, in a case in which the identified object is approaching the vehicle, adjust the predetermined distance that prescribes the virtual plane such that the predetermined distance becomes smaller, and, in a case in which the identified object is moving away from the vehicle, adjust the predetermined distance that prescribes the virtual plane such that the predetermined distance becomes larger.

7. A display method for a vehicle that includes a rear imaging section that captures images rearward of a vehicle, a rear lateral imaging section that captures images laterally rearward of the vehicle, and a display unit, the method comprising:

generating a combined image in which a rear processed image, which is obtained by processing a rear image captured by the rear imaging section in accordance with a first predetermined parameter, and rear lateral processed images, which are obtained by processing rear lateral images captured by the rear lateral imaging section in accordance with a second predetermined parameter, are combined into a single image; and displaying the combined image at the display unit, wherein generating the combined image includes:

identifying an object that exists in at least one of the rear image or the rear lateral images;

acquiring relative information of the object that includes relative position and relative speed of the identified object with respect to the vehicle, and includes blind spot regions of the combined image that are regions that are not depicted in the combined image and that are formed in conjunction with the generating the combined image;

on the basis of the acquired relative information of the object, determining whether or not the identified object will disappear from the combined image due to the identified object entering into the blind spot regions; and in a case of determining that the identified object will disappear, changing the blind spot regions by adjusting the first and second predetermined parameters such that the identified object does not disappear from the combined image.

8. A non-transitory storage medium that stores a program executable by a computer to perform displaying processing at a vehicle that includes a rear imaging section that captures images rearward of a vehicle, a rear lateral imaging section that captures images laterally rearward of the vehicle, and a display unit, the displaying processing comprising:

generating a combined image in which a rear processed image, which is obtained by processing a rear image captured by the rear imaging section in accordance with a first predetermined parameter, and rear lateral processed images, which are obtained by processing rear lateral images captured by the rear lateral imaging section in accordance with a second predetermined parameter, are combined into a single image; and displaying the combined image at the display unit, wherein generating the combined image includes:

identifying an object that exists in at least one of the rear image or the rear lateral image;

acquiring relative information of the object that includes relative position and relative speed of the identified object with respect to the vehicle, and includes blind spot regions of the combined image that are regions that are not depicted in the combined image and that are formed in conjunction with the generating the combined image;

on the basis of the acquired relative information of the object, determining whether or not the identified object will disappear from the combined image due to the identified object entering into the blind spot regions; and in a case of determining that the identified object will disappear, changing the blind spot regions by adjusting the first and second predetermined parameters such that the identified object does not disappear from the combined image.

* * * * *